United States Patent [19]
Coleman et al.

[11] Patent Number: 5,471,373
[45] Date of Patent: Nov. 28, 1995

[54] ENTERTAINMENT APPARATUS FOR USE WITH A SUCKER TYPE POP

[76] Inventors: Thomas J. Coleman, 89 Winding Way Rd., Bristol, Va. 24201; William K. Schlotter, IV, 175 Toluca Rd., Stafford, Va. 22554; Princess A. Coleman, 89 Winding Way Rd., Bristol, Va. 24201; Ann M. Schlotter, 175 Toluca Rd., Stafford, Va. 22554

[21] Appl. No.: 377,709
[22] Filed: Jan. 25, 1995
[51] Int. Cl.⁶ ............................................. F21V 33/00
[52] U.S. Cl. ....................... 362/109; 362/208; 362/253
[58] Field of Search ........................... 362/86, 109, 157, 362/190, 202, 205, 208, 253, 811

[56] References Cited

U.S. PATENT DOCUMENTS

| | | | |
|---|---|---|---|
| 3,184,587 | 5/1965 | Quijada | 362/190 |
| 4,670,820 | 6/1987 | Eddins et al. | 362/86 |
| 4,744,013 | 5/1988 | Lee et al. | 362/109 |
| 4,914,748 | 4/1990 | Schlotter, IV et al. | 362/208 |
| 5,079,679 | 1/1992 | Chin-Fa | 362/202 |

*Primary Examiner*—Ira S. Lazarus
*Assistant Examiner*—Y. Quach

[57] ABSTRACT

A candy sucker holder entertainment device in which a light flashes pulses of light onto a candy sucker users face to the beat of music or as sounds made by integrated circuit. The integrated circuit is loaded with the different sounds and a switch is operated to activate the integrated circuit for the different sounds. The device is used mainly by children for amusement during eating a candy sucker.

3 Claims, 2 Drawing Sheets

ENTERTAINMENT APPARATUS FOR USE WITH A SUCKER TYPE POP

This invention relates to a sucker type lolly pop and more particularly to a neat entertainment apparatus which plays music and which controls a pulsating light which flashes upon a person's face during consumption of the lolly pop.

Heretofore many different types of sound generating devices have been made such as talking dolls and other types of entertainment devices. Play type music boxes such as for music instruments have been provided. Music boxes for different uses have also been provided.

This invention is directed to an entertainment apparatus which supports a lolly pop for consumption and which plays different sounds of music simultaneously with control of a pulsating light which shines upon the consumers face during consumption of the lolly pop.

It is therefore an object to provide an entertainment apparatus which adds to the enjoyment of consuming a lolly pop.

A further object is to provide different sounds of music simultaneous with a pulsating or flashing light during consumption of a lolly pop.

Other objects and advantages of the invention will become obvious from the following description of the invention when taken together with the accompanying drawing.

Figure 1:
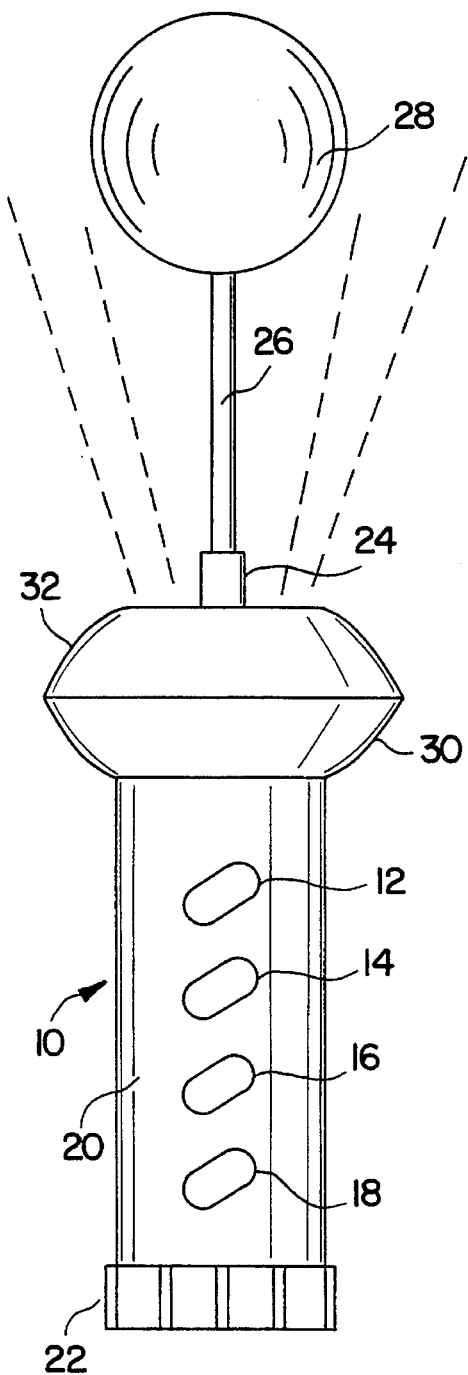
FIG. 1 illustrates a side-elevational view of an entertainment apparatus for use with a lolly pop.

Now referring to the drawings there is shown an entertainment apparatus for use with a sucker type pop in which the apparatus plays music rhythm, adds cymbals, high tom-toms and low tom-tom drumbeats to the music. Simultaneous with the music drumbeats, etc. a light bulb will produce pulses of light to the music, cymbols and or high or low tom-tom beats. The light will flash different for the different sounds. The sounds and music are directed toward a candy sucker pop and towards a persons face during consumption of the sucker. On carrying out the invention an integrated circuit is loaded with music, verbal remarks, animal sounds, space sounds or any other sounds by changing the integrated circuit for such functions. In carrying out the invention, different apparatus may be made with different sounds so that a user may purchase different apparatus for the different sound and light effects.

As shown in FIG. 1 the apparatus includes a holder or housing 10 of any desired material such as plastic. The housing may be round, square or any other desired shape. As seen the housing is provided with four carbon-tipped function buttons 12, 14, 16 and 18 which are pushed to complete an electrical circuit to operate the apparatus. The housing has a main body portion 20 and a bottom enclosure 22 which may be threaded onto the bottom end of the housing for adding or changing batteries. The upper end of the housing is enlarged in order to enclose a speaker and a light bulb. The upper end of the housing is provided with an aperture 24 for reception of a bottom end of a candy sucker stick 26 to which a candy sucker 28 is secured to the upper end. The upper end of the housing having an end cap which is formed in two pieces 30, 32 for enclosure of the speaker and light bulb.

Figure 2:
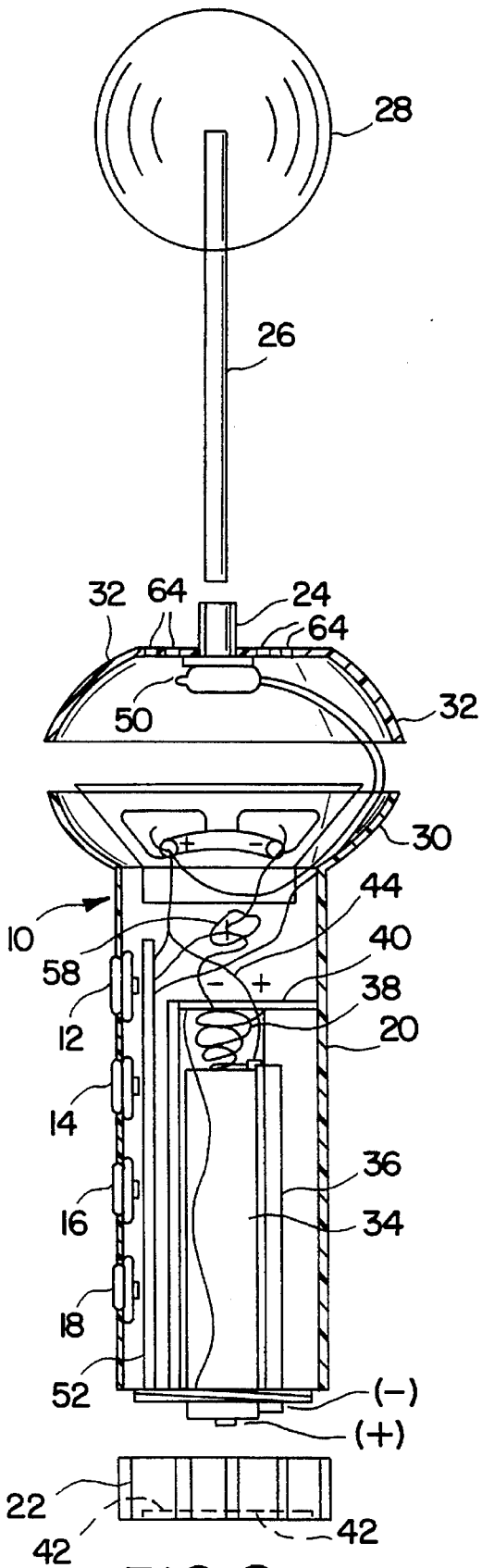
FIG. 2 is a partial cross sectional view illustrating the assembled parts.
Figure 4:
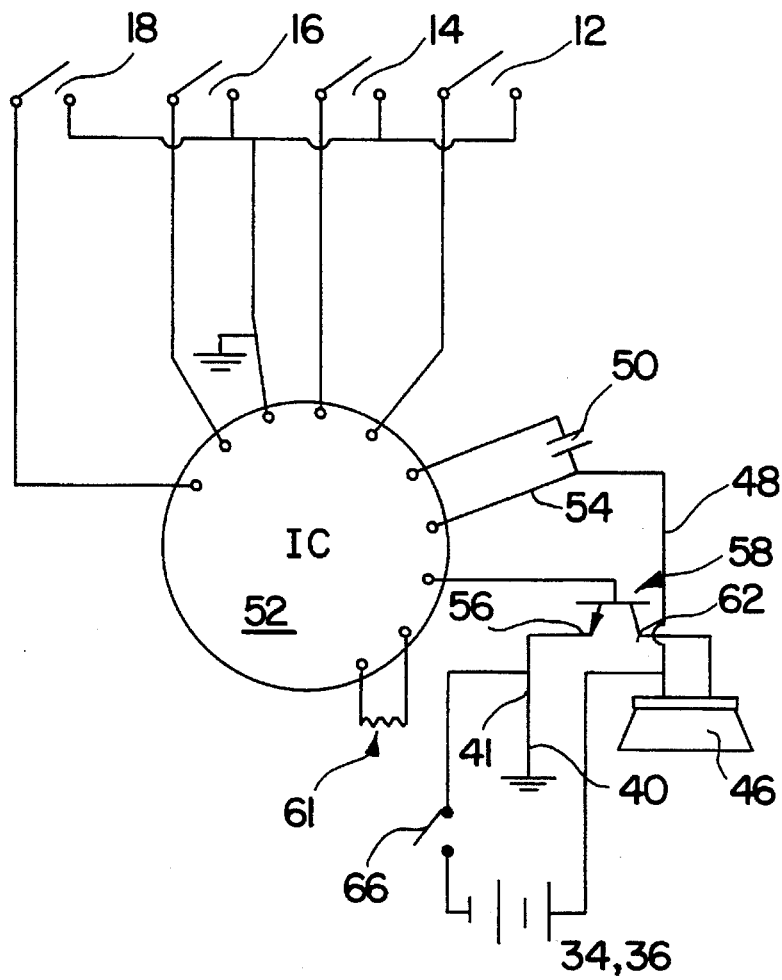
FIG. 4 illustrates a schematic of the electrical circuitry and related parts.

FIG. 2 illustrates a partial cross-sectional view illustrating the relationship of the various parts. A cross-section of the housing 20 is shown with the switches 12, 14, 16 and 18 which includes within the housing two batteries 34 and 36 connected in series. A spring 38 has one end grounded to a conductor 40 with the opposite end pressing the battery 34 toward a conductive plate 42 in the bottom cap 22 so that the positive end of the battery 34 is in contact with the copper plate. The ground end of the battery 36 is in electrical contact with the copper plate 42 and connects at its positive end to a conductor wire 44 which is connected to one side of a speaker 46. A wire 48 connects the positive side of the speaker 46 to a positive side of a light bulb 50 which in turn is connected to an integrated circuit 52 by a conductor wire 54. The ground conductor 40 is connected to an emitter 56 of a NPN transitor 58 via a conductor wire 41. The base of the transistor 58 is connected with the integrated circuit 52 and the collector 62 of the transistor is connected with the other side of the speaker 46. An ohm resistor is connected to the integrated circuit as shown in FIG. 4.

Figure 3:
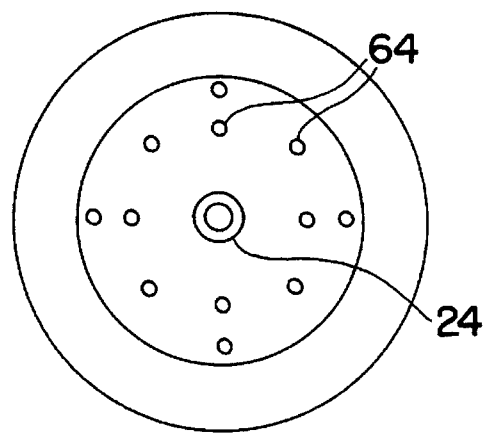
FIG. 3 illustrates a top view of the top cap or top enclosure.

The upper end of the housing is shown in FIG. 3. As shown, the upper end of the housing is provided with a plurality of apertures 64 through which the light from the light bulb and sound from the speaker can pass. The resistor and transistor have been shown separately from the integrated circuit. It would be obvious to one skilled in the art that the resistor and transistor could be incorporated into the integrated circuit. A master switch 66 has been shown in the circuit which can be operated to activate and inactivate the circuit.

In operation, the integrated circuit synthesizer is programmed to store the different sounds desired to be heard by the operator. The sounds are stored in sequence so that the different sounds are activated by specific switches placed in an orderly fashion. Assuming that music is programmed as set forth earlier in the specification, then with the master switch closed, the switch 12 will activate rhythmic music which will be sounded over the speaker and as the music changes for different notes or beats the light bulb will flash different sequences of flashes. Any one of the other switches or all of the switches in sequences can be pushed to add to the rhythmic music, cymbals, and the high or low tom-tom beats. It is not necessary to operate the switches 12, 14, 16 and 18 in sequence. Each switch will activate the integrated circuit to produce whatever sound has been programmed for that switch, thus any one of the switches can be operated for one particular sound or all of the switches can be operated for a combination of sounds. Simultaneous with the sound, the bulb will flash in accordance with the different sounds.

The upper cap can be made such that the two parts are screwed together or such that they can be pressed together for assembly. The size batteries used will be dictated by the requirements of the electrical circuitry, the speaker and the bulb. It is well known to those skilled in the art that miniature parts are available and can be used to carry out the invention.

In carrying out the invention the entertainment apparatus, for example, may be made as follows: The resistor 61 may be 150K ohms and the output amplifier 58 may be of a type HE-2050S; the integrated circuit 52 may be a type 15D-1000A voice-music synethesizer; the speaker 46 my be a type YD-1, one inch to two inch in size with an output of 0.25 watts at 8 ohms. The switches may be carbon tip type or any other suitable type. The types and value of the components may vary depending on the size of the housing and the output level desired.

It will be obvious to those skilled in the art that the apparatus may be made differently than as described and the invention as set forth in the appended claims is not to be limited to the precise details of construction set forth herein and such variations and modifications are intended to be included within the scope of the appended claims.

What is claimed is:

1. A holder for a candy sucker in which the holder includes a sound producing integrated circuit synthesizer, an electrical source, an electrical circuit, a speaker, a light producing means, and control mean for operating the electrical circuit interconnecting said circuit synthesizer, said electrical source, said speaker and said light producing means the holder includes a lower end to which an enclosure is to be attached and an upper end having an end cap to which the candy sucker is to be attached, said end cap is juxtaposed said speaker and light producing means, said end cap includes apertures therein through which flashes of light and sound pass whereby light flashes will be flashing upon a persons face as the candy sucker is consumed and the sound will pass through the apertures.

2. A holder for a candy sucker as set forth in claim 1 wherein said synthesizer is loaded with a plurality of different sounds and said holder includes a plurality of switch means for activating said different sounds, and each said switch means for activating each of said different sounds.

3. A holder for a candy sucker as set forth in claim 1 wherein said holder includes a housing, said housing includes said enclosure which is removable and said end cap which is removable said upper end cap enclosing said speaker, said light producing means, and including means for holding an end of a candy sucker stick associated with said candy sucker.

\* \* \* \* \*